United States Patent [19]

Wilber et al.

[11] 4,247,866

[45] Jan. 27, 1981

[54] NESTED LOOP VIDEO DISC SERVO SYSTEM

[75] Inventors: James A. Wilber; Todd J. Christopher, both of Indianapolis, Ind.

[73] Assignee: RCA Corporation, New York, N.Y.

[21] Appl. No.: 74,515

[22] Filed: Sep. 11, 1979

[51] Int. Cl.³ .............................................. H04N 5/76
[52] U.S. Cl. .................................. 358/8; 358/128.6; 360/36
[58] Field of Search ................ 358/4, 8, 128.5, 128.6; 360/36, 38; 179/100.1 G, 100.1 S, 100.3 V

[56] References Cited

U.S. PATENT DOCUMENTS

| | | | |
|---|---|---|---|
| 3,871,020 | 3/1975 | Wilber | 358/8 |
| 3,873,990 | 3/1975 | Wilber | 358/8 |
| 3,965,482 | 6/1976 | Burrus | 358/128.6 |

Primary Examiner—Terrell W. Fears
Assistant Examiner—Donald McElheny, Jr.
Attorney, Agent, or Firm—E. M. Whitacre; J. S. Tripoli; R. G. Coalter

[57] ABSTRACT

An active filter separates the function of a principal feedback loop which provides velocity error correction from that of a nested feedback loop which provides video signal frequency correction. A further feedback loop responsive to the active filter output signal and normally open under steady-state conditions, is closed under transient conditions for supplying a limited gain reducing signal to the input of the active filter whereby transient disturbance of the primary and nested loops is minimized with no loss of loop gain under steady-state conditions. The third loop includes a dead zone amplifier for distinguishing between transient and steady-state conditions and a limiter for limiting the gain reducing signal to a level below that which otherwise would tend to drive the active filter into a non-linear slow recovery condition.

11 Claims, 3 Drawing Figures

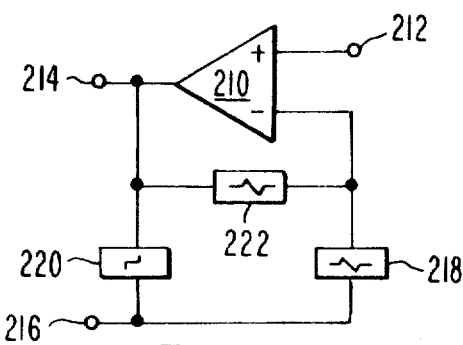
Fig. 2.
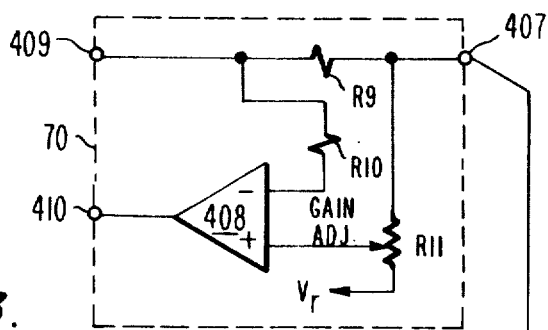
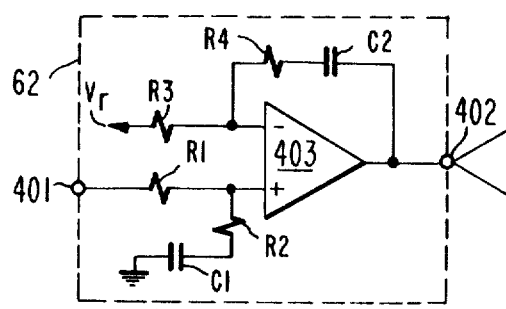
Fig. 3.
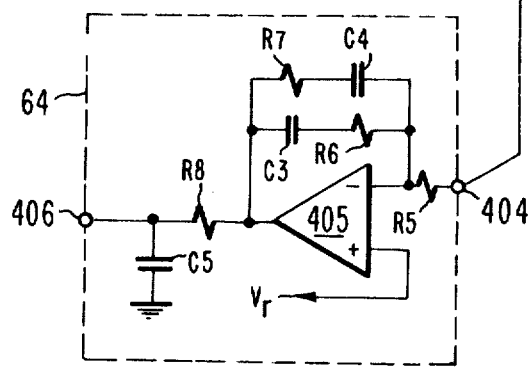

NESTED LOOP VIDEO DISC SERVO SYSTEM

This invention relates to video disc players and particularly to nested loop servo systems employed in such players.

An example of a video disc player which includes a nested loop servo system (i.e., a servo system employing a loop-within-a-loop) is described in U.S. Pat. No. 3,965,482 entitled "Velocity Correction Circuit For Video Discs" which issued to T. W. Burrus, June 22, 1976. The Burrus player includes a turntable for rotating a video disc, a pickup transducer for sensing capacitance variations representative of information recorded on the disc in the "buried subcarrier" (BSC) format and an oscillator responsive to the capacitance variations for producing an FM output signal. The FM signal is then demodulated to produce a composite video signal which is converted from the BSC format to an NTSC format by means of a video converter.

An advantageous feature of the Burrus player is that errors in the disc-pickup relative velocity and errors in the recovered chrominance frequency are corrected by means of a single two-loop servo system. It includes a color burst keyed phase detector which produces a composite error signal representative of phase and frequency errors between the output of an NTSC reference frequency crystal oscillator and the color burst component of the chrominance output signal produced by the video converter. A filter separates the composite error signal into two component error signals. One of the component error signals is applied to a stylus tangential position control transducer (known as an "arm stretcher") to form a principal feedback loop for minimizing velocity errors of the pickup stylus relative to the surface of the disc. By this means frequency errors in both the chrominance and luminance components of the composite video output signal (due, for example, to disc warpage or eccentricity) are minimized. The other of the component error signals is applied to a voltage controlled oscillator which forms part of a heterodyning circuit in the video converter. The auxiliary feedback loop thus formed (which is nested within the principal feedback loop) provides minimization of phase and frequency errors in the chrominance component of the composite video output signal.

A further advantageous feature of the Burrus system is that the filter which separates the composite error signal into component error signals is an active filter, that is, a filter having a gain greater than unity. This provides the benefit of allowing the overall loop gain to be increased while retaining the ability to optimize the gain of each individual feedback loop to meet its specific requirements. This, of course, cannot be achieved merely by adjustment of the gain of the phase detector since the composite error signal produced by it contains both of the component error signals. The specific form of the active filter is a cascade connection of an active low-pass filter having a corner frequency of 7.5 Hz followed by a passive low-pass filter having a corner frequency of 0.27 Hz. Since the passive filter (which provides the VCO control voltage) follows the active filter (which provides the arm stretcher control voltage) in the cascade connection, it receives the benefit of the gain provided by the active filter so that both signals derived from the cascade connection are of greater amplitude (in their respective frequency bands) than the composite error signal.

The present invention resides in part in recognition of certain potential problems which are related to systems of the kind discussed above. One problem is that under transient signal conditions (where the composite error signal is much greater than its normal steady state operating value) the active filter may be driven into a non-linear or "saturated" mode of operation. This can greatly lengthen the overall system acquisition or stabilization time and may undesirably alter the transfer function of the filter. A further problem is that since the filter provides gain, large transient voltages at its input are further amplified with the result that the arm stretcher transducer may be over stressed and the VCO may be driven to a frequency far removed from its normal operating range. These possibilities also have the effect of increasing the servo system acquisition time. All of these problems are compounded if one attempts to replace the passive low-pass filter of the cascade connection with an active low-pass filter to achieve even higher loop gain and thus further minimize servo system errors.

A second aspect of the invention resides in recognition of the shortcomings of conventional techniques for solving transient instability problems. For example, one might consider merely limiting one or both outputs of the active filter by means of diodes. While such an approach could prevent over stressing of the transducer and over pulling of the VCO, it could not prevent the filter from being driven into saturation for the duration of a transient signal condition. An alternative, which at first glance appears feasible, would be to merely limit the output of the phase detector with a conventional diode limiter to a range of values less than that which would overdrive the active filter. Such an approach, however, is difficult to implement because the normal (non-saturating) input voltage range for the active filter is smaller than its normal output voltage range by a factor equal to its gain. As a result, limiting the phase detector output would require the use of a very high precision small-signal limiter. Worse still, any change in gain of the active filter would require resetting the limiter threshold levels and this complicates the tasks of both manufacturing a player and maintaining or servicing such a player.

The present invention is directed to improving the transient response characteristics of a video disc player of the kind which includes an error detector for producing a composite error signal and an active filter for separating the composite error signal into two portions, one portion for application to a composite video signal error correction feedback loop and the other portion for application to a chrominance signal error correction feedback loop.

In accordance with one aspect of the invention the player is provided with a transient detection and suppression circuit having an input coupled to a selected point in one of the feedback loops for detecting transient disturbances and having an output coupled to supply a gain reducing signal to the active filter during the time the transient disturbance is present.

In accordance with another aspect of the invention, the transient detection and protection circuitry comprises a third feedback loop responsive, when closed, for supplying the gain reducing signal to an input of the active filter, for controlling circuitry for closing the third feedback loop under transient signal conditions and for opening the third feedback loop under steady state signal conditions and for operating limiting circuitry for limiting the magnitude for the gain reducing signal supplied to the active filter under transient signal conditions.

The above and further aspects of the invention are presented in detail in the following description and drawings wherein like reference numbers designate like elements and in which:

FIG. 2 is a block diagram of a limiting and subtraction circuit suitable for use in the video disc player of FIG. 1; and FIG. 3 is a schematic diagram of a pair of active low-pass filters and a transducer driver amplifier suitable for use in the video disc player of FIG. 1.

Figure 1:
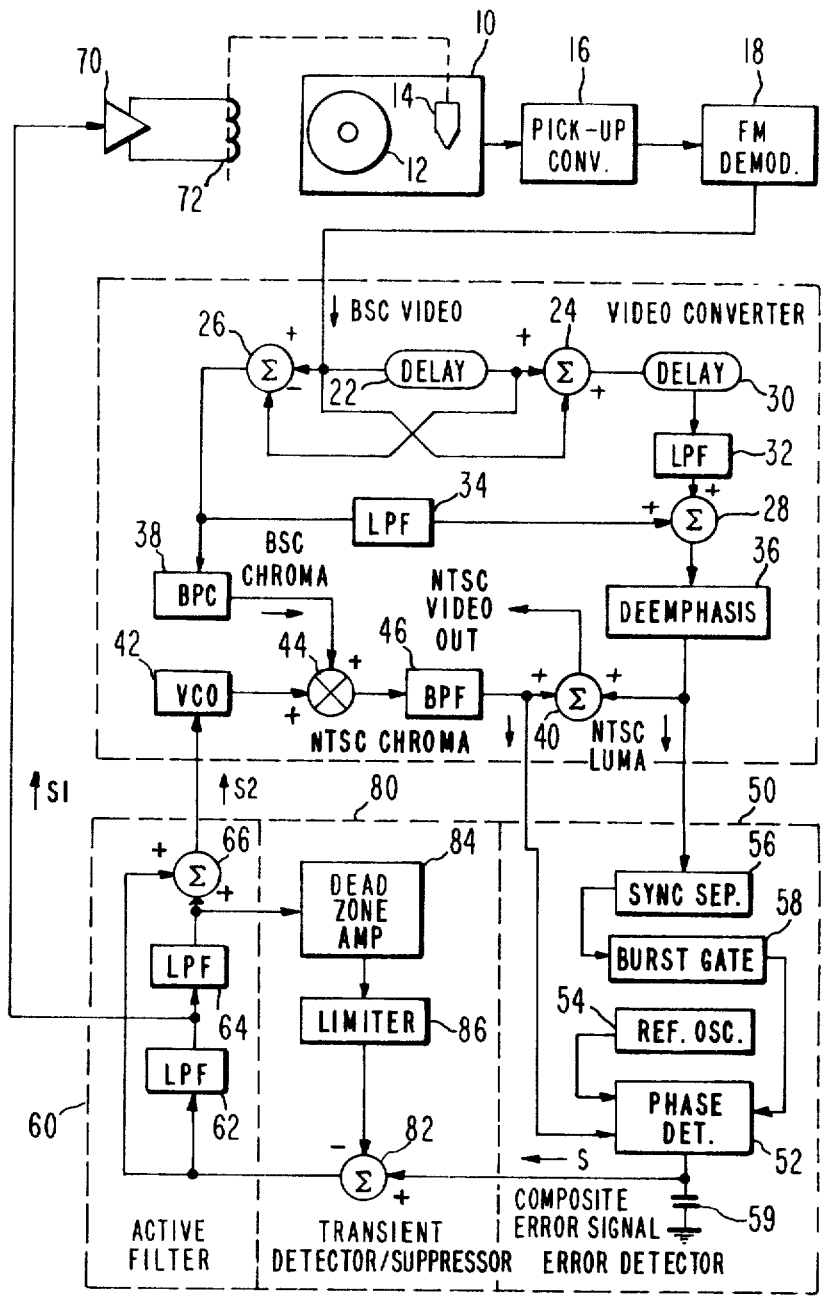
FIG. 1 is a block diagram, partially in schematic form, of a video disc player embodying of the invention.

The video disc player in FIG. 1 comprises a turntable 10 for rotating video disc 12 and a pickup transducer 14 for recovering video information from the disc. Illustratively, it will be assumed that the player is intended for use with records in which information is stored in the form of topological variations and recovered by sensing capacitance variations between pickup transducer 14 and the record 12. The output of transducer 14 is coupled to the input of a pickup converter circuit 16 which comprises a capacitance-to-voltage converter responsive to capacitance variations between a stylus in transducer 14 and the record being played for producing an FM output signal voltage representative of the recorded information. Such records and suitable circuits for implementing the capacitance-to-voltage conversion function of pickup circuit 16 are well known. See, for example, U.S. Pat. No. 3,783,196 entitled "High-Density Capacitive Information Records And Playback Apparatus Therefor" which issued to T. O. Stanley, Jan. 1, 1974, U.S. Pat. No. 3,972,064 entitled "Apparatus And Methods For Playback Of Color Pictures/Sound Records" which issued to E. O. Keizer, July 27, 1976; and U.S. Pat. No. 3,711,641 entitled "Velocity Adjusting System" which issued to R. C. Palmer, Jan. 16, 1973.

Video FM demodulator circuit 18 converts the FM signal produced by pickup circuit 16 to a video output signal. For purposes of illustrating certain features of the invention, it will be assumed that the video signals recorded on the disc are in the previously mentioned "buried subcarrier" (BSC) format rather than the conventional NTSC format. As is known (see, for example, U.S. Pat. No. 3,872,498 entitled "Color Information Translating Systems", which issued to D. H. Pritchard, Mar. 18, 1975), in the BSC format, chrominance information is represented by a color subcarrier of the general form employed in the well-known NTSC format. However, the chrominance component in the BSC format is not located in the high end of the luminance signal video band, as in NTSC, but rather is buried in a lower portion of the video band. An illustrative subcarrier frequency choice is in the vicinity of 1.53 MHz, with the color subcarrier side bands extending ±500 KHz thereabout and with the luminance signal band extending well above the highest color subcarrier frequency (to 3 MHz, for example).

FM demodulator 18 illustratively may be of the pulse counting type or of the phase lock loop (PLL) type. A suitable pulse counting type FM demodulator is disclosed in U.S. Pat. No. 4,038,686 entitled "Defect Detection And Compensation" which issued to A. L. Baker, July 26, 1977. An FM demodulator of the phase lock loop type is described in the U.S. patent application, Ser. No. 948,013 of T. J. Christopher et al., entitled "FM Signal Demodulator With Defect Detection" which was filed Oct. 2, 1978.

The composite video signal produced by FM demodulator 18 is converted from the BSC format to an NTSC format by video converter 20 (outlined in phantom). The BSC video signal is supplied to the input of delay line 22 and is summed with the output of delay line 22 by means of summation circuit 24 to thereby form a comb filter which separates the luminance component from the composite color video signal. The delay of delay line 22 is selected such that the luminance comb filter has frequency response characterized by multiple response peaks falling at even integral multiples at half the nominal horizontal line frequency and multiple rejection notches falling at odd integral multiples of half the nominal line frequency. Illustratively, a suitable delay would be equivalent to one horizontal scan interval.

The output of delay line 22 is subtracted from the BSC video signal by subtraction circuit 26 to thereby form another comb filter which passes the chrominance component of the composite video signal. This chrominance comb filter has a frequency response characteristic having multiple peaks falling at odd integral multiples of half the nominal horizontal line frequency and multiple rejection notches falling at even integral multiples of half the normal line frquency.

Delay line 22 may be a conventional LC delay line, an acoustic delay line or may be of a charge couple device (CCD) type. See for example, the article by J. Matob, entitled "Charge Couple Device" which appeared in the January, 1975 issue of Wireless World). Further advantages and examples of comb filtering and video format conversion may be found in:

U.S. Pat. No. 3,872,498 entitled "Color Information Translating System" which issued to D. H. Pritchard, Mar. 18, 1975; U.S. Pat. No. 3,996,610 entitled "Comb Filter Apparatus For Video Playback Systems" which issued to H. Kawamoto, Dec. 7, 1976 and, the U.S. patent application of T. J. Christopher and L. L. Tretter entitled "Video Processing System Including Comb Filters" Ser. No. 966,512 which was filed Dec. 4, 1978 now U.S. Pat. No. 4,195,309.

Since the frequency range of the luminance signal component in the BSC format is substantially the same as in the NTSC format, all that remains to provide a proper NTSC luminance output signal is to compensate for preemphasis which was performed in the recording process and to supplement the signal with information relating to vertical detail which was lost in the luminance comb filtering process. Vertical detail supplementation is provided by coupling the output of summation circuit 24 to one input of a further summation circuit 28 via cascade connection of a delay element 30 and a low-pass filter 32 and coupling the output of subtraction circuit 26 to the other input of summation circuit 28 via a low-pass filter 34. Suitable design parameters for the coupling elements would be: a delay of about 500 nSec for delay element 30 (this compensates for the difference delays through low-pass filters 32 and 34); a pass-band of 0.5 MHz for low-pass filter 32; and a pass-band of 0.500 KHz for low-pass filter 34. Compensation for preemphasis is provided by coupling the output of summation circuit 28 to the input of deemphasis circuit 36 which preferably has a transfer characteristic complementary to that of the preemphasis circuit used in the recording process.

The output of subtraction circuit 26 contains both low frequency information (which is passed by low-pass filter 34 for supplementing vertical detail of the luminance signal as previously mentioned) and the chrominance signal in BSC format. The low frequency information is rejected by connecting the output of subtraction circuit 26 to the input of band-pass filter 38 which preferably has a pass band of about 1 MHz centered at the BSC frequency of nominally 1.53 MHz.

Since the frequency range of the chrominance signal in the BSC format (nominally 1.53 MHz) is lower than its range in the NTSC format (nominally 3.58 MHz), up-conversion of the output signal of band-pass filter 38 is necessary before the chrominance and luminance signals may be added (in summation circuit 40) to produce an NTSC composite video signal. This frequency translation is provided by voltage controlled oscillator (VCO) 42, multiplier 44 and band-pass filter 46. The output frequency of VCO 42 (when at the center of its control range) is nominally 5.11 MHz. Accordingly, multiplier 44, which mixes or multiplies the BSC chrominance signal produced at the output of band-pass filter 38 with the output of VCO 42, produces output signals of nominally 3.58 and 6.64 MHz. Band-pass filter 44 passes the lower frequency signal (which corresponds to the NTSC chrominance signal standard) to summation circuit 40 where it is summed with the NTSC luminance signal produced at the output of de-emphasis circuit 36 to thereby provide a composite video output signal in the NTSC format for the video disc player.

Multiplier 44 and band-pass filter 46 may be of conventional design. It is desirable, however, that VCO 42 feature high stability and be capable of wide frequency deviation. A preferred voltage controlled oscillator having a wide deviation range, is disclosed in the U.S. patent application of T. J. Christopher and J. Wilber entitled "Variable Frequency Oscillator" Ser. No. 51,826 which was filed June 25, 1979.

The remaining elements of FIG. 1 comprise a nested loop servo system in which the output of an error detector 50 is separated into two components, one being applied in a first feedback path (to transducer 14) for correcting velocity errors and the other being applied via a second feedback path (to VCO 42) for correcting frequency and phase errors of the chrominance component of the NTSC composite video output signal. Detector 50 comprises a color burst keyed phase detector 52 which compares the frequency and phase of the color burst component of the chrominance signal produced at the output of band-pass filter 46 with the standard NTSC reference frequency (3.579, 545 MHz) produced by reference oscillator 54. Keying of phase detector 52 is provided by sync separator 56 which detects the horizontal synchronizing pulses in the NTSC format luminance signal produced at the output of deemphasis circuit 36 and supplies an enabling signal to burst gate 58 when each horizontal synchronizing pulse appears. Burst gate 58 then enables phase detector 52 during the so-called "back porch" interval of the horizontal synchronizing pulse where the color burst signal is located. Since phase detector 52 is only enabled during the color burst interval, its output voltage (which represents the servo system composite error signal S) is stored for the remainder of the horizontal line interval by means of holding capacitor 59.

Separation of the composite error signal S into component error signals S1 and S2 is provided by means of active filter 60 which comprises a cascade connection of two active low-pass filters 62 and 64. The output of the first of these filters (62) is applied via driver amplifier 70 to arm stretcher transducer 72 for providing velocity error correction. Transducer 72 is mechanically coupled to the player pickup transducer 14 for controlling the tangential position of the pickup stylus relative to the video information track recorded on the video disc 12. If the disc is out-of-round, for example, transducer 100 changes the effective length of the pickup arm in consonance with rotation of the disc in a sense to compensate for its eccentricity. Arm stretcher transducers suitable for performing this function are described, for example, in U.S. Pat. No. 3,882,267 entitled "Video Playback System Tracking Arm And Pickup Assembly" which issued to M. A. Leedom, May 6, 1975 and U.S. Pat. No. 3,983,318 entitled "Velocity Correction System With Damping Means" which issued to M. E. Miller and J. G. Amery, Sept. 28, 1976.

The output of the second low-pass filter 64 of the cascade connection is added in summation circuit 66 with the composite error signal S to produce a component error signal S2. This signal is applied to VCO 42 in video converter 20 in a sense to minimize frequency and phase errors in the chrominance component of the NTSC composite video output signal. The lower frequency component of signal S2 (that is, the component passed by filter 64) provides correction for very low frequency errors as might be caused, for example, by power line frequency fluctuations influencing the turntable rotational velocity. The broad band component of S2 (that is, the unfiltered component of S) provides correction for relatively high frequency errors due, for example, to spurious variations in the recovered video signal.

The design of filters 62 and 64 depends, among other things, upon the rotational velocity of the turntable and the power line frequency stability. Burrus, in the previously discussed patent, suggested a corner frequency for the first of the filters (62) of 7.5 Hz (which corresponds to a turntable rotational velocity of 450 RPM) and a corner frequency for the second of the filters of 0.27 Hz. FIG. 4 which will be discussed subsequently, presents a preferred filter design in which both of filters 62 and 64 are active filters rather than a combination of an active filter and a passive filter as shown in the Burrus patent. This provides much greater gain in the "nested" loop (i.e., the loop including VCO 42) and therefore, provides reduced loop errors.

Transient detector-suppressor circuit 80 comprises a dead zone amplifier 84 having an input coupled to the output of active low-pass filter 64 and an output coupled via limiter 86 to subtraction circuit 82. A dead zone amplifier adaptable for use as amplifier 84 is described in U.S. Pat. No. 3,851,259 entitled "Dead Zone Circuit" which issued to D. J. Parwaski, Nov. 29, 1974. A preferred dead zone amplifier is described by J. Wilber and B. Yorkanis in their U.S. patent application entitled "Amplifier Having Dead Zone Of Controllable Width And Position", Ser. No. 058,022 which was filed July 16, 1979. Limiter 86 and subtraction circuit 82 may be implemented by conventional methods as separate elements or, preferably by a unitary arrangement as shown in FIG. 2 and discussed herein-after.

Operation of the player of FIG. 1 is most easily understood by considering first the case where a record is being played and sufficient time has lapsed for all transients to have decayed. Under this steady-state operating condition the BSC composite video signal derived from transducer 14 via converter 16 and demodulator 18 will be converted to an NTSC output signal by converter 20 as previously explained. Assume also that the frequency of the color burst component of the NTSC chrominance signal equals that of oscillator 54 and is in phase quadrature therewith. In that case, no error exists and capacitor 59 will be charged by phase detector 52 to a voltage which will maintain VCO 42 at its nominal center frequency value (5.11 MHz) and position transducer 72 to the center of its control range. Should a change occur in the color burst frequency or phase, the voltage on capacitor 59 will change in a sense to cause the frequency of VCO 42 and/or the position of transducer 72 to vary in a sense to counteract the change.

The purpose of active filter 60 is to shape the frequency response of both the principal feedback loop, which includes transducer 72 and the nested feedback loop, which includes VCO 42 such that the loop gain of the principal feedback loop is greater than the loop gain of the nested feedback loop in the region of about 1 Hz to about 250 Hz. To illustrate, assume now that the color burst component changes frequency at a rate of 7.5 Hz as would be caused, for example, by a warped or eccentric record. In that case the filter 60 allows the loop gain of the principal feedback loop to be at least 20 dB greater than that of the nested feedback loop and thus the counteracting signal to the transducer 72 does the majority of the correction, correcting velocity errors (and thus frequency errors) in both the chrominance and luminance output signals. Some correction will be done by the VCO due to the signals from both the direct path and from the low pass filter 64.

For frequencies above about 250 Hz, where the gains of the principal and nested feedback loops are equal, the VCO 42 provides the majority of the correction to the chrominance signal only. At very low frequencies (below about 1 Hz where the filters 62 and 64 again force the loop gains of primary and nested loops to be equal) the additional gain provided by filter 64 assures that VCO 42 receives the greater portion of the error signal.

Transient detector-protector circuit 80 has essentially no effect on the steady state operation described above because the width of the dead zone of amplifier 84 is selected to be greater than the expected or normal peak-to-peak variations of the output voltage of low-pass filter 64. As a result, under steady state conditions, amplifier 84 acts in effect as an open circuit so that the transient protection feedback loop formed by amplifier 84, limiter 86 and subtraction circuit 82 is inoperable under such conditions. This is an advantageous feature of the invention since it assures that under steady state conditions there is no loss in loop gain of either the primarily (velocity correction) feedback loop or the nested (chrominance signal correction) feedback loop due to the presence of the detection and protection circuitry.

Under transient signal conditions, dead zone amplifier 84 "closes" the aforementioned protection feedback loop and supplies a counteracting (negative feeedback) signal to the input of filter 62 which reduces the gain of both filter 62 and filter 64. As an illustration, assume that a transient disturbance occurs which results in loss-of-carrier to the FM demodulator 18, which results in loss-of-sync to sync separator 56 which results in the phase detector having no output other than its offset. Because the low pass filters 62 and 64 are very high gain, any finite offset will eventually result in large voltage at the output of filter 64.

When the output of filter 64 exceeds the dead zone range of dead zone amplifier 84 any excess signal will be amplified by amplifier 84, and subtracted by subtraction circuit 82 from the signal applied to the input of filter 62. This will cause the output voltage of filter 64 to decrease to the limit of its normal operating range (i.e., the dead zone threshold) for the remainder of the duration of the transient disturbance. Since filter 64 is within its "normal" operating range and is the second filter in the cascade connection, it follows that filter 62 will also be maintained within its "normal" or unsaturated operating range.

The purpose of limiter 86 is to defeat the dead zone amplifer 84 when transients occur (while the system is in phase lock) which exceed the dead zone range of the dead zone amplifier 84 but are of small enough amplitude and/or duration that the loop can track the transients when the dead zone amplifier is defeated.

For example, consider that the rotational velocity of the record 12 is some velocity higher than nominal such that the VCO 42 must be at a frequency higher than nominal, which causes the output of low-pass filter 64 to be at a voltage higher than nominal and very near a limit of the dead zone amplifier 84. Furthermore, assume that a dust particle on the pickup transducer 14 causes loss of proper color subcarrier for a few lines and that the output of the low-pass filter 64 passes a limit of the dead zone amplifier during this time. Assume in addition that when proper color subcarrier is restored the system is still in phase lock (though a substantial phase error may exist). The limiter 86 limits the output of the dead zone amplifier 84 to a value significantly less than the dynamic range of phase detector 52 so that the dead zone amplifier 84 cannot force the phase locked system to lose lock.

The functions of limiter 86 and subtraction circuit 82 may be implemented by a unified arrangement as shown in FIG. 2 which includes a differential amplifier 210 connected at the non-inverting input thereof to an input terminal 212 and at the output thereof to an output terminal 214. A further input terminal 216 is coupled via a linear resistive path 218 to the non-inverting amplifier input and via a non-linear path 220 to the amplifier output. A further linear resistive path 222 is coupled between the inverting input and the output of the amplifier to complete a feedback path. Illustratively the linear resistive paths may comprise conventional resistors or other elements exhibiting a linear relationship between voltate and current. The non-linear path may comprise, for example, a pair of inverse parallel connected PN diodes or a pair of serially connected "back-to-back" Zener diodes.

As applied to FIG. 1, input terminal 212 would be connected to the output of error detector 50 for receiving the composite error signal S (i.e., the voltage on capacitor 59). Input terminal 216 would be coupled to the output of dead zone amplifier 84 for receiving its output current under transient signal conditions. (If a voltage output type of dead zone amplifier is used, then some means, such as a resistor, should be used to limit the input current to terminal 216). Output terminal 214 would be connected to the input of low-pass filter 62 and to summation circuit 66 for supplying an output voltage thereto equal to the composite error signal S minus a voltage of limited magnitude proportional to the output current of amplifier 84.

In operation, consider first the steady state condition where the output voltage of filter 64 is within the dead zone of amplifier 84. In that case, no current will be supplied to terminal 216 and none will flow through elements 218, 220 and 222. Because of the negative feedback provided by resistive path 222 differential amplifier 210 will thus operate as a non-inverting unity gain voltage follower to apply the composite error signal S to active filter 60.

Under transient signal condition dead zone amplifier 84 will supply current to terminal 216 and this current will be conducted via linear resistive paths 218 and 222 to the output of amplifier 210. If the sum of the voltages produced across paths 218 and 222 is less than the threshold voltage of non-linear path 220 then amplifier 210 will operate as a unity gain non-inverting voltage follower as to the composite error signal and as a fixed gain inverting and summing amplifier as to the current supplied to terminal 216. The output voltage of amplifier 210 may readily be calculated using the formula:

$$E_o = S - IR_2 \quad (1)$$

wherein:

$E_o$ is the output voltage at terminal 214;
S is the composite error signal voltage;
$R_2$ is the resistance value of path 222; and
I is the output current of amplifier 84.

In the case where the sum of the voltages produced across paths 218 and 222 exceeds the threshold voltage of path 220, excess current is conducted by path 220 to the output of amplifier 210 thereby limiting any further increase in the incremented component of output voltage (i.e., the negative term of equation 1). Accordingly, under this condition the output voltage assumes a value of:

$$E_o = S - \frac{V_t R_2}{R_1 + R_2} \quad (2)$$

wherein: $E_o$ and S are as previously defined and $V_t$ is the threshold voltage of non-linear path 220 and $R_1$ is the resistance value of path 218.

In FIG. 3 active filter 62 comprises an input terminal 401 for connection to the output of subtraction circuit 82 and an output terminal 402 for supplying an output signal to driver amplifier 70 and active filter 64. Terminal 401 is coupled to the non-inverting input of differential amplifier 403 via resistor R1 and to ground by a series connection of resistor R2 and capacitor C1. Amplifier 403 may be of conventional design but preferably includes a buffer amplifier output stage (not shown) to provide sufficient output current for driving arm stretcher transducer 72 as well as the inputs of amplifiers 405 and 408. The inverting input of amplifier 403 is coupled to a source of reference voltage, $V_r$, (not shown) via resistor R3 and to output terminal 402 via the serial combination of resistor R4 and capacitor C2. The value of the reference voltage should equal to nominal output voltage of error detector 50 under zero error steady state operating conditions; (i.e., the condition when the color burst component of the NTSC chrominance signal is of equal frequency and in phase quadrature with the output of oscillator 54).

Active filter 64 comprises an input terminal 404 for receiving the output of filter 62 and an output terminal 406 for supplying an output signal to summation circuit 66 and to the input of dead zone amplifier 84. Terminal 404 is coupled to the inverting input of a differential amplifier 405 via resistor R5 and thence to the output of amplifier 405 via a series connection of resistor R6 and capacitor C3 which is paralleled by a second series connection of resistor R7 and capacitor C4. The output of amplifier 405 is coupled to output terminal 406 via resistor R8 and thence to ground via capacitor C5. The non-inverting input is coupled to the source of reference volage $V_r$, preferably by means of a bias current equalization resistor (not shown) having a value equal to that of resistor R5. (The bias current equalization resistor does not affect the time constants of the filter and may be dispensed with in cases where the incremental voltage drop across resistor R5 due to input bias current flow of amplifier 405 may be neglected).

Representative values for the elements of filters 62 and 64 for use in a video disc player having a nominal turntable speed of 450 RPM and an arm stretcher resonance frequency of 70 Hz are as follows:

| filter 62 | filter 64 |
|---|---|
| R1 56 | R5 390C |
| R2 6.8 | R6 180 |
| R3 56 | R7 130C |
| R4 100 | R8 47 |
| C1 0.33 | C3 0.12 |
| C2 0.015 | C4 0.15 |
| | C5 0.047 |

Resistance values are expressed in thousands of ohms and capacitance values are expressed in millionths of a farad.

Using the above values the transfer function of filter 62 will exhibit a slope of −6 dB/octave to a first break frequency of about 7.5 Hz (the turntable rotational velocity), −12 dB/octave to a second break frequency of about 70 Hz (the arm stretcher transducer resonant frequency) and zero dB/octave thereafter. This transfer function combined with that of the arm stretcher transducer (which is assumed to exhibit a +6 dB/octave slope of its resonance frequency and −6 dB/octave thereafter) provides a closed loop net transfer function having a slope of zero to the turntable "once-around" frequency of 7.5 Hz and a negative slope of 6 dB/octave thereafter.

Active filter 64 exhibits a transfer function having a slope of −6 dB/octave to a frequency of about 0.8 Hz, zero slope to a frequency of about 1.6 Hz, −6 dB/octave to a frequency of about 7.5 Hz, zero to a frequency of about 60 Hz and −6 dB/octave thereafter. Since filter 64 is connected in cascade with filter 62 (to receive the benefit of the gain provided by amplifier 403) the resultant transfer function exhibits a slope of −12 dB/octave to a frequency of about 0.8 Hz, −6 dB/octave to about 1.6 Hz, −12 dB/octave to about 60 Hz, −18 dB/octave to about 70 Hz and −6 dB/octave thereafter.

Driver amplifier 70 comprises an input terminal 407 for receiving component error signal S1 from filter 62 and a pair of output terminals 409 and 410 for connection to transducer 72. Terminal 409 is coupled to terminal 407 via resistor R9 and to the inverting input of differential amplifier 408 via resistor R10. The non-inverting input of amplifier 408 is connected to the wiper of gain adjustment potentiometer R11 the body of which is connected at one end thereof to terminal 407 and at the other end thereof to the source of reference voltage $V_r$. Amplifier 408 may be of conventional design but preferably includes an output buffer stage to provide sufficient output current drive capability for transducer 72.

In operation transducer 72 (when connected across terminals 409 and 410) provides a negative feedback path for amplifier 408 which maintains the voltage at terminal 409 (the effective summing junction) equal to the voltage at the non-inverting input of amplifier 408. This voltage, $V_p$, in turn, equals a fraction (determined by the setting of the wiper) of the difference in the voltage, S1, at terminal 407 and the reference voltage $V_r$ which appears across potentiometer R11. As a result, the current, $I_L$, conducted by resistor R9 is equal to the difference between S1 and $V_p$ divided by the resistance of R9. Since the bias current demand at the inverting input of amplifier 408 is negligible compared with $I_L$, the transducer current necessarily equals $I_L$ and since $I_L$ is independent of the transducer voltage the transducer current is therefore dependent only on S1, $V_r$, R9 and the setting of R11. In a given player, $V_r$, R9 and R11 are all constant parameters. Accordingly, amplifier 70 serves as a voltage-to-current converter (commonly called a VIC) for causing a current to flow through transducer 72 which is linearly related to the composite error signal S1 and independent of the voltage across transducer 72.

The benefits of the present invention apply generally to video disc players of the kind employing nested loop servo systems and an active filter for separating the loop functions and one may modify the player of FIG. 1 in various ways and still receive these benefits. For example, velocity error correction may be accomplished dispensing with transducer 72 and amplifier 70 and utilizing the component error signal S1 for controlling the turntable speed. This could be done either by varying the motor drive power or by applying braking force to the turntable in response to signal S1. If one chooses to utilize the preferred form of VCO 42 one may also dispense with summation circuit 66. This is possible because the preferred VCO has differential inputs and so may be used for summing signals by inverting one of the signals to be summed.

what is claimed is:

1. In a video disc player of the kind which includes a nested loop servo system comprising an error detector for producing a composite error signal and an active filter for separating the composite error signal into two portions, one portion for application to a principal feedback loop which provides velocity error correction, the other portion for application to a nested auxiliary feedback loop which provides video signal frequency correction, the improvement, comprising:
    transient detection and suppression means having an input coupled to a selected point in one of said feedback loops for detecting a transient signal disturbance and having an output coupled to supply a gain reducing signal to said active filter during the time said transient disturbance is present.

2. A video disc player as recited in claim 1 wherein said active filter has an input for receiving said composite error signal, a first output for supplying said one portion to said principal feedback loop and a second output for supplying said other portion to said auxiliary feedback loop and wherein said transient detection and suppression means comprises:
    a third feedback loop coupled between said second output and said input of said active filter for conducting said gain reducing signal therebetween when closed and for blocking said gain reducing signal when open; and
    control means for closing said third feedback loop in response to said transient disturbance and for opening said third feedback loop upon termination of said transient disturbance.

3. A video disc player as recited in claim 2 wherein said control means comprises a dead zone amplifier connected in said third feedback loop, the input of said amplifier being coupled to said second output of said active filter, the output of said amplifier being coupled to said input of said active filter.

4. A video disc player as recited in claim 2 further comprising limiter means in said third feedback loop for limiting the magnitude of said gain reducing signal.

5. A video disc player as recited in claim 1 wherein said active filter has an input for receiving said composite error signal, a first output for supplying said one portion to said principal feedback loop and a second output for supplying said other portion to said auxiliary feedback loop and wherein said transient detection and suppression means comprises:
    a dead zone amplifier having an input connected to the second output of said active filter and an output for producing said gain reducing signal;
    limiter means for limiting the magnitude of said gain reducing signal; and
    means for subtracting the limited magnitude gain reducing signal produced by said limiter means from the composite error signal produced by said error detector to produce a difference signal for application to said input of said active filter.

6. In a video disc player of the kind including a nested loop servo system comprising an error detector for detecting a frequency error in a chrominance component of a composite video output signal and producing a composite error signal representative of said frequency error, an active filter for separating said composite error signal into two component error signals, a first feedback path responsive to one of said component error signals for correcting frequency errors of said composite video output signal and a second feedback path responsive to the other of said component error signals for correcting frequency errors of only said chrominance component of said composite video output signal, said active filter having a gain greater than unity, said servo system being subject to transient disturbances, the improvement for suppressing said transient disturbances, wherein the improvement comprises:
    a third feedback path coupled between an output of said active filter and an input thereof, for supplying a gain reducing signal to said input of said active filter when a selected one of said component error signals exceeds a predetermined range of values; and
    means in said third feedback path for limiting the magnitude of said gain reducing signal to a value less than that which would tend to overdrive said active filter into a non-linear mode of operation.

7. A video disc player as recited in claim 6 wherein said third feedback path includes a dead zone amplifier having an input coupled to said output of said active filter and an output coupled to said input of said active filter.

8. A video disc player as recited in claim 6 further comprising means in said third feedback path for subtracting the limited magnitude gain reducing signal from the composite error signal produced by said error detector for application to said input of said active filter.

9. A video disc player as recited in claim 6 wherein said active filter comprises a cascade connection of two low-pass filters and wherein each of said low-pass filters is an active low-pass filter and wherein each of said active low-pass filters exhibits a gain greater than unity over at least a portion of its pass-band.

10. In a video disc player of the kind comprising a turntable for rotating a video disc, a pickup transducer proximate said disc for producing signal variations representative of information recorded on said disc, an oscillator responsive to said signal variations for producing an FM output signal, a demodulator for demodulating said FM output signal to produce a composite video signal, a video converter for providing said composite video signal in an NTSC format, a color burst keyed phase detector for producing a composite error signal representative of phase and frequency errors between the output signal of a reference frequency crystal oscillator and the color burst component of an NTSC chrominance output signal produced by said video converter, an active filter for separating the composite error signal into first and second components, an arm-stretcher transducer responsive to said first component and coupled to said pickup transducer for varying the position of said pickup transducer in a sense to minimize frequency errors in both the chrominance and luminance components of said composite video output signal produced by said video converter and a voltage controlled crystal oscilllator in said video converter responsive to said second component of said composite error signal for correcting phase and frequency errors of solely the chrominance component of said NTSC composite video output signal, the improvement, comprising:

a dead zone amplifier having an input coupled to a node in said active filter for producing a feedback signal when a signal at said node exceeds a predetermined range of values; and circuit means for limiting said feedback signal and for subtracting said feedback signal from said composite error signal.

11. A video disc player as recited in claim 10 wherein said circuit means comprises:

a differential amplifier having inverting and non-inverting inputs and an output;

means for applying said composite error signal to the non-inverting input of said differential amplifier;

means for applying said feedback signal to the inverting input of said differential amplifier via a linear resistive path;

means for applying said feedback signal to the output of said differential amplifier via a non-linear path;

a further linear resistive path connected between the inverting input and the output of said differential amplifier; and means coupling the output of said differential amplifier to an input of said active filter.

* * * * *